United States Patent [19]

Härtel

[11] Patent Number: 4,759,534
[45] Date of Patent: Jul. 26, 1988

[54] ACTIVE TWO-CHAMBER ENGINE MOUNT WITH HYDRAULIC DAMPING

[75] Inventor: Volker Härtel, Germering, Fed. Rep. of Germany

[73] Assignee: Metzeler Kautschuk GmbH, Munich, Fed. Rep. of Germany

[21] Appl. No.: 887,889

[22] Filed: Jul. 18, 1986

[30] Foreign Application Priority Data

Jul. 18, 1985 [DE] Fed. Rep. of Germany ....... 3525673

[51] Int. Cl.$^4$ ............................................. F16M 3/00
[52] U.S. Cl. .................................. 267/140.1; 188/268
[58] Field of Search ............... 188/267, 268; 267/8 R, 267/140.1; 248/638, 635

[56] References Cited

FOREIGN PATENT DOCUMENTS 2736188 2/1979 Fed. Rep. of Germany ... 267/140.1
2111171 6/1983 United Kingdom ................. 188/267

Primary Examiner—Joseph Falk
Attorney, Agent, or Firm—Herbert L. Lerner; Laurence A. Greenberg

[57] ABSTRACT

An active two-chamber engine mount with hydraulic damping includes rubber-elastic peripheral walls, a rigid intermediate plate disposed within the peripheral walls defining two chambers interconnected by a channel formed in the intermediate plate, one of the chambers being an engine-side chamber bordered by one of the peripheral walls acting as a support spring exercising a spring deflection, mutually parallel and overlapping electrodes defining the channel, an electro-viscous fluid filling the chambers, a device for applying an electric field to the electrodes controlling viscosity of the fluid, and a device for varying the length of the channel and the degree of overlap of the electrodes in dependence on the spring deflection of the support spring.

7 Claims, 1 Drawing Sheet

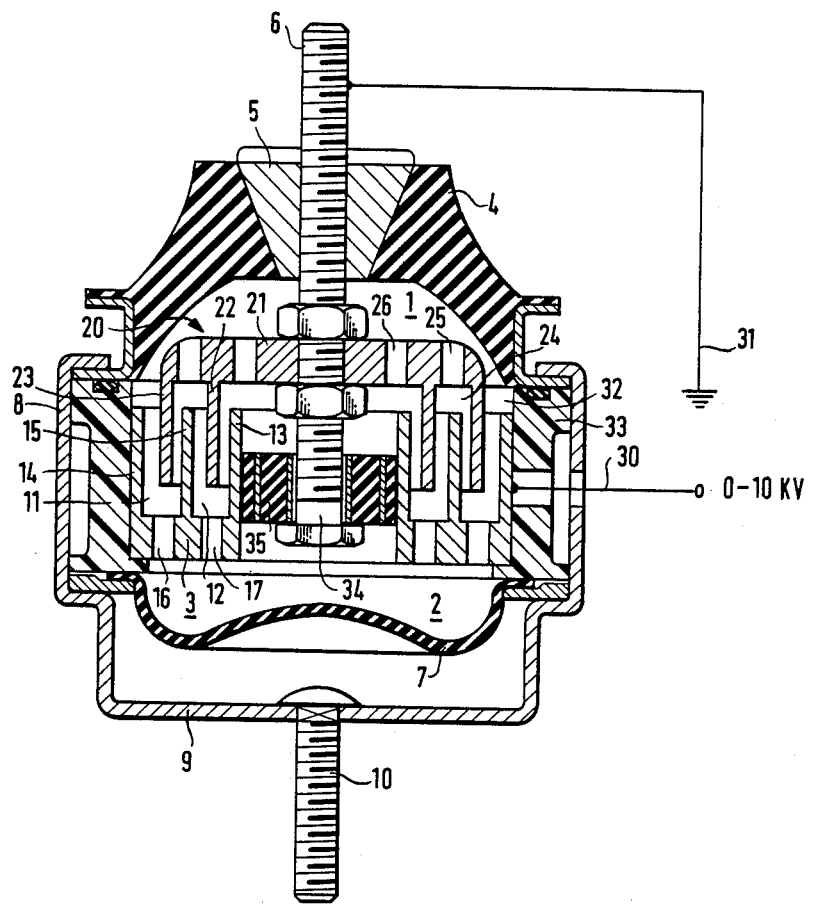

ACTIVE TWO-CHAMBER ENGINE MOUNT WITH HYDRAULIC DAMPING

The invention relates to a two-chamber engine mount or motor support with hydraulic damping, including chambers filled with an electro-viscous fluid, having peripheral walls formed of rubber-elastic material, the chambers being in communication with each other through a channel disposed in a rigid intermediate plate, the viscosity of the fluid being controllable by applying an electric field in the vicinity of the channel.

A support of this type is known from German Published, Non-Prosecuted Application DE-OS No. 33 36 965, corresponding to U.S. application Ser. No. 659,714, filed Oct. 11, 1984. In that device, the channel is formed by two plate electrodes which are disposed at a distance from each other in the intermediate plate, so that a very flat channel is formed, having a rectangular cross section. If a potential is applied to the electrodes, the viscosity of the flowing electro-viscous fluid is increased, so that the damping and especially the stiffness of the mount, can be controlled electrically. However, the maximum stiffness which can be obtained in this way is limited by the volume-stiffness of the upper chamber. Since it is also possible to close the channel with the aid of the electric field, the maximum stiffness of this engine mount is determined by the spring stiffness of the upper part and the additional stiffness which is determined by the virtual piston diameter and the volume-stiffness of the upper part. Higher degrees of stiffness and accordingly a greater degree of regulation, cannot be obtained with an apparatus of this kind.

Furthermore, during normal operation of such a hydraulically-damped mount, the configuration and especially the length of the flow channel is of the greatest importance, because these parameters are used to tune the fluid column in the channel to suitable self resonances by conventional methods.

It is accordingly an object of the invention to provide an active two-chamber engine mount with hydraulic damping, which overcomes the hereinafore-mentioned disadvantages of the heretofore-known devices of this general type, which can be regulated over a wider regulation range and which can have a much greater stiffness, going far beyind the degree which is determined by the volume-stiffness of the chamber on the engine side.

With the foregoing and other objects in view there is provided, in accordance with the invention, an active two-chamber engine mount with hydraulic damping, comprising rubber-elastic peripheral walls, a rigid intermediate plate disposed within the peripheral walls defining two chambers interconnected by a channel formed in the intermediate plate, one of the chambers being an engine-side chamber bordered by one of the peripheral walls acting as a support spring exercising a spring deflection or stroke, mutually parallel and overlapping electrodes defining and bordering the channel, an electro-viscous fluid filling the chambers, means for applying an electric field to the electrodes controlling viscosity of the fluid, and means for varying the length of the channel and the degree of overlap of the electrodes in dependence on the spring deflection or stroke of the support spring.

In accordance with another feature of the invention, at least two of the electrodes are concentrically disposed first annular electrodes of the intermediate plate being spaced apart defining ring gaps therebetween, and others of the electrodes are concentrically disposed second annular counter electrodes mechanically coupled to the support ring and projecting from above into the ring gaps.

The gaps which remain between the annular electrodes form defined flow passages for the fluid. If an electrical field is applied between the lower fixed electrodes and the upper counter electrodes which are coupled with the support spring, the viscosity and therefore the flow resistance of the electro-viscous fluid in the flow channel is increased, so that the stiffness of the device is also increased in the conventional manner.

Furthermore, the shear stresses thus generated between the movable upper electrodes and the fixed lower electrodes leads to an additional increase of the stiffness, which goes far beyond the stiffness that can be obtained by the volume-stiffness of the upper chamber.

In accordance with a further feature of the invention, the intermediate plate is a fixed electrode assembly in the form of a cylindrical ring of conductive material having two end surfaces, the intermediate plate having remaining walls at one of the end surfaces forming the first annular electrodes with the ring gaps therebetween, and the intermediate plate having passageways formed therein for conducting the fluid from the ring gap to the other end surface thereof.

In accordance with an added feature of the invention, there is provided a sport housing attached to the peripheral walls, and an insulating material ring holding the electrode assembly in the support housing.

In accordance with an additional feature of the invention, there is provided a bell-shaped hood from which the two second annular counter electrodes project downward defining other ring gaps therebetween, an engine support plate disposed on the hood, and a bolt passing through the engine support plate and being force-lockingly connected to the hood.

In accordance with again another feature of the invention, the hood has openings formed therein in alignment with the other ring gaps for the passage of the fluid.

In accordance with a concomitant feature of the invention, the bolt has an inner end extending into the vicinity of the fixed electrode assembly, one of the first annular electrodes is an inner annular electrode, and including a rubber bushing between the inner end of the bolt and the inner annular electrode being relatively soft or yielding for thrust loads and relatively stiff in radial direction. This is done in order to avoid a short circuit between the concentric annular electrodes, if transverse forces should occur.

Other features which are considered as characteristic for the invention are set forth in the appended claims.

Although the invention is illustrated and described herein as embodied in an active two-chamber engine mount with hydraulic damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection accompanying single figure of the drawing.

BRIEF DESCRIPTION OF THE DRAWING

The single figure of the drawing is a diagrammatic, longitudinal-sectional view of an active two-chamber engine mount.

Referring now to the figure of the drawing in detail, there is seen a two-chamber engine or motor mount having an upper engine or motor-side chamber 1 and a lower chamber 2 disposed in the conventional manner, wherein the two chambers are interconnected through channels in an intermediate plate 3, which will be described below. The upper chamber 1 is bordered by a strong-walled, hollow, conical chamber wall 4, which is a so-called support spring, that can be fastened at the upper end surface thereof through a support plate 5 and a bolt or stud 6, to a non-illustrated engine or motor, for example. The lower chamber 2 is formed by a cup or saucer-shaped chamber wall 7, which is also made of a rubber elastic material, but is softer than the material which forms the chamber wall 4, because practically speaking, the chamber 2 only functions as an equalization chamber. All of the parts of the engine mount are sealed by a circumferential or peripheral annular flange or support housing 8, so that the annular flange 8, which is also shaped like a cup or saucer, can be fastened through a lower housing cover 9 and a connecting bolt or stud 10 to the chassis of the vehicle.

The intermediate plate 3 is constructed as a fixed electrode assembly, and in the illustrated embodiment, it is a cylindrical ring made of a conductive material having two ring gaps 11 and 12 formed in the upper end surface thereof, defining remaining intermediate walls 13, 14 and 15 forming electrode rings. Openings or passageways 16 and 17 in the form of bores or annular slots lead from the bottom of the ring gaps 11 and 12 to the opposite end surface of the intermediate plate 3, so that a hydraulic connection to the power equalizing chamber 2 is provided.

According to the illustrated embodiment, two mutually concentric electrode rings 22 and 23 protrude from a counter electrode 20 formed of a bell-shaped hood or dome 21 and enclose a ring gap 24. One end of the hood 21 is force-lockingly connected to the bolt 6 which extends through the support plate 5, while the other end reaches downward into the vicinity of the fixed electrode 3. A force-locking connection is one which uses external force to interconnect two parts, as opposed to a form-locking connection provided by the shape of the parts themselves. The hood 21 has additional perforations or openings 25 and 26 formed therein in order to permit the fluid in the chamber 1 to flow into the annular gap 24 and into the space inside the electrode ring 22.

Due to the stiff coupling of the counter electrode 20 to the engine or motor and to the support spring 4, the electrode rings 22 and 23 directly follow or react to any vibrations that may occur, and dip into the ring gaps 11 and 12 of the electrode rings 13, 14 and 15, like a comb. Upon the occurrence of greater amplitudes with low frequency, a fluid transfer takes place from the chamber 1 into the chamber 2, through flow channels having a geometry determined by the ring gaps 11, 12 and 24 or by the electrode rings which dip into these gaps. The flow of the fluid is accordingly aided by the upper hood 21, which participates in this motion.

The support is filled with an electro-viscous fluid, which may be formed, for example, of a mixture of solid silicic acid, a suitable organic phase with a low dielectric constant such as isododecan and a dispersing agent. If a voltage is applied to the electrodes 3 and 20 through lines 30 and 31, the viscosity of the fluid increases along with the flow resistance in the flow channels, so that the stiffness of the engine mount is increased. Due to the shearing stresses which therefore occur between the movable upper electrode 20 and the fixed, clamped lower electrode 3, an additional increase of the stiffness is obtained, which is considerably greater than the volume-stiffness of the upper chamber 1. The result is a clear increase of the dynamically changing forces, even if the upper chamber 1 is constructed so as to be very soft with respect to its volume, and/or if it would not be theoretically present.

Obviously, the two electrodes 3 and 20 have to be electrically insulated. For this purpose, the electrode 3 is inserted in a cylindrical recess 32 of a ring 33 which is made of an insulating material. The ring 33 is clamped to the upper part 4 and the lower chamber wall 7 by the annular flange 8. The hood 21 has to be insulated with respect to the housing in the same manner.

Furthermore, in order to avoid a short circuit between the concentric electrode rings 13, 14 and 15 on one hand and 22 and 23 on the other hand, an annular rubber bushing 35 is inserted between the inner end 34 of the stud 6 and the inner electrode ring 13. The rubber bushing 35 is constructed in such a way that it is soft with respect to thrust, but stiff in the radial direction. This permits motions in the vertical direction, but prevents the electrodes from approaching each other too closely if tilted, because this could lead to a spark over.

In the illustrated embodiment, the electrodes only have a certain number of electrode rings and ring gaps. Naturally, the invention also includes constructions which have different configurations and/or different numbers of electrodes and electrode rings. The essential objective is for the electrodes to form flow channels with respect to each other, which are disposed in such a way that their position realtive to each other and the degree to which they cover each other, is variable.

I claim:

1. Active two-chamber engine mount with hydraulic damping, comprising rubber-elastic peripheral walls, a rigid intermediate plate disposed within said peripheral walls defining two chambers interconnected by a channel formed in said intermediate plate, one of said chambers being an engine-side chamber bordered by one of said peripheral walls acting as a support spring exercising a spring deflection, mutually parallel and overlapping electrodes defining said channel, an electro-viscous fluid filling said chambers, means for applying an electric field to said electrodes controlling viscosity of said fluid, and means for varying the length of said channel and the degree of overlap of said electrodes in dependence on said spring deflection of said support spring.

2. Active two-chamber engine mount according to claim 1, wherein at least two of said electrodes are concentrically disposed first annular electrodes of said intermediate plate being spaced apart defining ring gaps therebetween, and others of said electrodes are concentrically disposed second annular counter electrodes mechanically coupled to said support ring and projecting from above into said ring gaps.

3. Active two-chamber engine mount according to claim 2, wherein said intermediate plate is a fixed electrode assembly in the form of a cylindrical ring of conductive material having two end surfaces, said intermediate plate having walls at one of said end surfaces forming said first annular electrodes with said ring gaps therebetween, and said intermediate plate having passageways formed therein for conducting said fluid from said ring gaps to said other end surface thereof.

4. Active two-chamber engine mount according to claim 3, including a support housing attached to said peripheral walls, and an insulating material ring holding said electrode assembly in said support housing.

5. Active two-chamber engine mount according to claim 3, including a bell-shaped hood from which said second annular counter electrodes project downward defining other ring gaps therebetween, an engine support plate disposed on said hood, and a bolt passing through said engine support plate and being locked to said hood.

6. Active two-chamber engine mount according to claim 5, wherein said hood has openings formed therein in alignment with said other ring gaps for the passage of said fluid.

7. Active two-chamber engine mount according to claim 5, wherein said bolt has an inner end extending into the vicinity of said fixed electrode assembly, one of said first annular electrodes is an inner annular electrode, and including a rubber bushing between said inner end of said bolt and said inner annular electrode being relatively soft for thrust loads and relatively stiff in radial direction.

* * * * *